United States Patent
Zajac

[15] 3,644,807
[45] Feb. 22, 1972

[54] FREQUENCY REGULATED INVERTER CIRCUIT FOR A SYNCHRONOUS MOTOR

[72] Inventor: Chester J. Zajac, Thomaston, Conn.
[73] Assignee: Robertshaw Controls Company, Richmond, Va.
[22] Filed: Apr. 28, 1970
[21] Appl. No.: 32,639

[52] U.S. Cl.....................318/138, 310/8.1, 318/171, 318/254, 318/341
[51] Int. Cl.......................................................H02k 29/00
[58] Field of Search.............310/8, 8.1, 8.6; 318/138, 171, 318/227, 254, 341

[56] References Cited

UNITED STATES PATENTS

| | | | |
|---|---|---|---|
| 3,121,832 | 2/1964 | Haskell et al. | 318/138 |
| 3,416,057 | 12/1968 | Froyd et al. | 318/138 X |
| 2,995,690 | 8/1961 | Lemon | 318/138 |
| 3,229,178 | 1/1966 | Favre | 318/138 |
| 3,250,066 | 5/1966 | Engelhardt et al. | 318/138 X |
| 2,666,196 | 1/1954 | Kinsley et al. | 310/8.1 |
| 3,131,320 | 4/1964 | Shinada et al. | 310/9.6 |

*Primary Examiner*—Gene Z. Rubinson
*Attorney*—Auzville Jackson, Jr., Robert L. Marben and Anthony A. O'Brien

[57] ABSTRACT

A frequency regulated inverter circuit for a synchronous motor for driving a clock, elapsed time indicator and the like, includes an oscillator circuit having a piezoelectric tuning fork filter in a feedback path thereof for generating a stable alternating current output signal having a frequency substantially equal to the resonant frequency of the tuning fork; the alternating current signal from the oscillator is wave-shaped, differentiated, and fed to the input of a frequency divider producing an output pulse upon the receipt of every sixth differentiated alternating current signal. The output pulse from the frequency divider is, in turn, fed through a steering network to a pair of switching transistors for alternately energizing a synchronous motor which can be used for driving a clock mechanism, elapsed time indicator or similar timing mechanisms.

23 Claims, 1 Drawing Figure

PATENTED FEB 22 1972
3,644,807
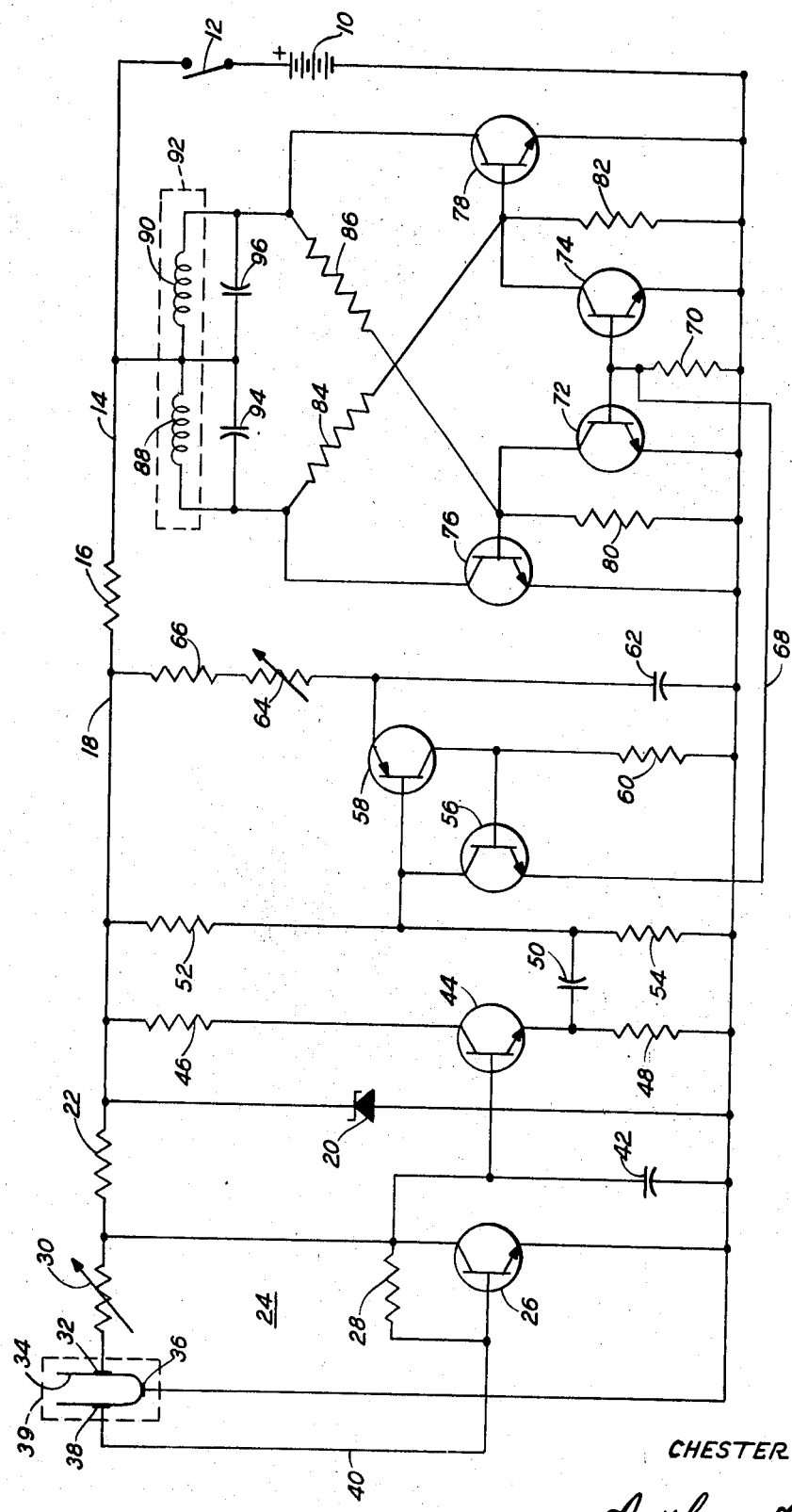
INVENTOR
CHESTER J. ZAJAC
BY Anthony A. O'Brien
ATTORNEY

FREQUENCY REGULATED INVERTER CIRCUIT FOR A SYNCHRONOUS MOTOR

BACKGROUND OF THE INVENTION

1. Field of the Invention

The present invention generally pertains to inverter circuits and more particularly to a frequency regulated inverter circuit for a synchronous motor driving a clock mechanism, elapsed time mechanism or similar timing mechanisms.

2. Description of the Prior Art

A stable inverter circuit capable of generating a regulated alternating current signal for energizing a synchronous motor driven mechanism from a direct current source of operating potential has long been sought after for use in conjunction with such devices as elapsed time indicators for vehicles of various types and accurate portable battery operated clocks, to name but a few. Such an inverter circuit must meet a number of stringent design requirements before its full utility may be realized. For example, the inverter circuit must be capable of generating a stable alternating current output waveform under various adverse conditions as may be caused by ambient temperature variations, input power variations, etc. In addition, it is often desirable to provide such inverter circuits with a means for fine tuning the output frequency of the signal fed to the synchronous motor such that component tolerance variations can be easily compensated for subsequent to the completion of the assembly of the circuit. It is further desired, especially in those applications contemplating usage of the inverter circuit with portable equipment and moving vehicles, to design such circuits with as few components as possible so as to reduce the cost, size and weight of the completed product.

The prior art is generally cognizant of inverter circuits performing many of the above mentioned functions; however, such conventional networks have not proven entirely satisfactory under all conditions of service since they are often highly complex, contain a large number of component parts, draw relatively large amounts of power, and are typically incapable of accurate operation over extended periods of use.

SUMMARY OF THE INVENTION

The present invention is summarized in that an inverter circuit for a synchronous motor includes an input network adapted to be connected with a source of direct current operating potential; an oscillator connected with the input network and including an amplifier having an input and an output, and a piezoelectric tuning fork filter connected with the input and output of the amplifier to form a closed feedback loop whereby the oscillator generates a sinusoidal alternating current signal at a particular frequency; a frequency divider connected with the oscillator and including a storage capacitor adapted to be selectively charged and discharged for producing periodic output pulses synchronized with the sinusoidal alternating current signal and having a frequency equal to the particular frequency divided by an integer; the synchronous motor including a pair of field windings; and a power switching network connected with the input network, the frequency divider, and the synchronous motor for alternately establishing a current flow through each of the pair of field windings in response to the periodic output pulses from the frequency divider whereby a stable frequency alternating current signal is applied to the synchronous motor to provide an accurate drive output which can be used for driving various timing devices such as clocks and elapsed time indicators.

It is an object of the present invention to construct an inverter circuit for a synchronous motor utilizing fewer components parts than the number of parts heretofore required.

The present invention has another object in the construction of a frequency regulated inverter circuit controlled by a stable oscillator network using a piezoelectric tuning fork filter in a feedback path thereof.

A further object of the present invention is to enable fine tuning of an inverter circuit for a synchronous motor.

The present invention has an additional object in that an inverter circuit for a synchronous motor generates a frequency-stable pulse signal for alternately energizing a pair of filed windings of the synchronous motor.

An additional object of this invention is to synchronously charge and discharge a storage capacitor for alternately triggering a bistable network to accurately energize a synchronous motor.

Further objects and advantages of the present invention will be apparent from the following description of the preferred embodiment when taken in conjunction with the accompanying drawing.

BRIEF DESCRIPTION OF THE DRAWING

The FIG. is a schematic diagram of an embodiment of a frequency regulated inverter circuit for a synchronous motor according to the present invention.

DESCRIPTION OF THE PREFERRED EMBODIMENT

As illustrated in the drawing, the circuit of the present invention receives operating potential from a source of positive voltage 10 which is connected between ground and one terminal of a main power switch 12. The other terminal of power switch 12 is connected to a first power bus 14 which is coupled through a resistor 16 to a second power bus 18. A Zener diode 20 is connected between the second power bus 18 and ground so as to maintain the second power bus at a regulated potential. Operating potential from power bus 18 is coupled through a resistor 22 to a semitunable oscillator, indicated generally at 24.

Oscillator 24 includes an NPN transistor 26 which has its emitter electrode directly connected to ground and its collector electrode connected to receive operating potential from resistor 22. The collector electrode of transistor 26 is additionally coupled to its base electrode by a biasing resistor 28 and is further coupled through a variable resistor 30 to a piezoelectric input transducer 32 which is fixedly mounted upon one tine of a tuning fork 34. The tuning fork 34 is grounded at point 36 and has a piezoelectric output transducer 38 fixedly mounted upon a second tine. Tuning fork 34 and piezoelectric transducers 32 and 38 cooperate to form a piezoelectric tuning fork filter, indicated generally at 39, having a peaked bandpass characteristic approximately centered about the resonant frequency of the tuning fork 34.

Piezoelectric output transducer 38 is electrically connected by line 40 to the base electrode of transistor 26 so as to complete a closed feedback loop from the collector electrode of transistor 26 through the serially connected variable resistor 30 and tuning fork filter 39 to the base electrode of the transistor such that the oscillator 24 generates sinusoidal AC signals at a frequency which is determined by the resonant frequency of the tuning fork 34 and the preset value of resistor 30. The output from oscillator 24 is taken from the collector electrode of transistor 26 and coupled to the junction of a capacitor 42 and the base electrode of an NPN transistor 44. The other terminal of capacitor 42 is connected to ground while the collector-emitter path of transistor 44 is connected between biasing resistors 46 and 48 which, together with transistor 44, are serially connected between the second power bus 18 and ground.

The junction of the emitter electrode of transistor 44 and resistor 48 is connected by a coupling capacitor 50 to the intermediate point of a voltage divider formed by a pair of resistors 52 and 54 which are serially connected between power bus 18 and ground. The intermediate point between resistors 52 and 54 is further connected to the collector electrode of an NPN transistor 56 and the base electrode of a PNP transistor 58. Similarly, the base electrode of transistor 56 is connected to the collector electrode of transistor 58 as well as to one terminal of a resistor 60 which has its other terminal connected to ground. The emitter electrode of transistor 58 is connected to the junction of a capacitor 62 and a variable resistor 64, the other terminal of variable resistor 64 being connected through a fixed resistor 66 to power bus 18 while the other terminal of capacitor 62 is directly connected to ground. Resistors 52, 54, 60, 64 and 66, capacitor 62, and transistors 56 and 58 form a frequency divider operating as a relaxation device synchronously responsive to triggering signals coupled through capacitor 50 to generate output pulses at the emitter electrode of transistor 56 at one-sixth the frequency of the triggering signals.

The output pulses from transistor 56 are coupled via line 68 to the junction of a temperature stabilizing resistor 70 and the base electrodes of a pair of steering transistors 72 and 74. The emitter electrodes of transistors 72 and 74 are coupled to ground while their collector electrodes are connected to the base electrodes of a pair of switching transistors 76 and 78, respectively. The base electrodes of transistors 76 and 78 are additionally coupled to ground through biasing resistors 80 and 82, respectively, while their emitter electrodes are directly connected to ground. The collector electrodes of transistors 76 and 78 are cross-coupled to the base electrodes of each other by resistors 84 and 86 so as to form a bistable network, and the collector electrodes of transistors 76 and 78 are additionally coupled to power bus 14 through respective coils 88 and 90 of a synchronous motor 92. A pair of capacitors 94 and 96 are connected in parallel with motor coils 88 and 90 to absorb switching transients and control the slope of the decaying voltage across the coils so as to assure the obtention of proper motor starting characteristics.

In operation, when main power switch 12 is closed, operating potential is fed from the direct current power supply 10 to power bus 14 and thence through resistor 16 to power bus 18. The potential at power bus 18 is regulated by Zener diode 20 to a fixed level so as to compensate for loading or other variations which would otherwise affect the operating potential from the power source 10. The potential at power bus 18 is fed through resistor 22 to the oscillator circuit 24.

When main power switch 12 is first closed, the operating potential coupled through resistor 22 is applied through resistor 30 to the piezoelectric input transducer 32 which converts the received electrical energy into mechanical energy so as to shock the tuning fork 34 whereupon it begins to oscillate at its natural or resonant frequency. As a result, the tuning fork applies mechanical energy to the output transducer 38 which thereafter produces a small electrical signal in line 40. The electrical signal in line 40 is fed to the base electrode of transistor 26 which is biased so as to act as an amplifier; the signals appearing at the base electrode of transistor 26 are thus amplified and appear at the collector electrode of the transistor. Since the collector of transistor 26 is connected to the input transducer 32 of the tuning fork 39 by resistor 30, the amplified signals from the transistor will be applied to the tuning fork filter so as to maintain the oscillating condition of tuning fork 34 at its resonant frequency. Thus, the amplifying transistor 26 cooperates with resistor 30 and tuning fork filter 39 to form a closed feedback loop whereby network 24 acts as a regenerative oscillator for generating a stable-frequency, sinusoidally varying alternating current signal. It should be noted that since the tuning fork 34 resonates at a particular frequency, the degree of coupling between electrical signals fed to input transducer 34 and electrical signals generated by output transducer 38 is greatest at the resonant frequency of the tuning fork. As the frequency of the input electrical signals varies from the resonant frequency of the tuning fork, the degree of coupling correspondingly falls off such that the tuning fork-transducer combination acts as a tuned band pass filter in the feedback path of transistor 26. Furthermore, since the loading of the piezoelectric transducers of the tuning fork filter 39 affects the bandwidth as well as the center frequency of the band pass characteristic of the device, and since variable resistor 30 acts as a load for input transducer 32, the effective center frequency of tuned filter 39 may be varied about the resonant frequency of the tuning fork by adjusting resistor 30. In a typical case, where the resonant frequency of the tuning fork 34 is 360 Hz. and variable resistor 30 is a 100,000 ohm. potentiometer, for example, the output frequency of the oscillator 24 may be varied plus or minus 0.15 percent about a base frequency of 360 Hz.

The output of oscillator 24 is taken from the collector of transistor 26 and fed to the base of NPN wave-shaping transistor 44 which cooperates with resistors 46 and 48 to produce a clipped or wave-shaped alternating current square wave signal at its emitter electrode at the output frequency of oscillator 24. The wave-shaped square wave signal from transistor 44 is fed to capacitor 50 which operates in conjunction with resistors 48 and 54 to differentiate the square wave signal and produce a pulse train signal containing alternate positive and negative pulses resulting, respectively, from the rapid negative to positive and positive to negative transitions of the input square wave. The alternate current pulse train from differentiating capacitor 50 is applied to the intermediate point of a voltage divider formed by resistors 52 and 54.

Voltage divider resistors 52 and 54 from one leg of a frequency divider, the other leg of which is formed by the series circuit of capacitor 62, variable resistor 64 and fixed resistor 66. The two legs of the frequency divider are coupled at intermediate points by transistors 56 and 58 to permit selective charging and discharging of capacitor 62 in synchronism with the pulse train produced by differentiating capacitor 50. Since the collector electrode of NPN transistor 56 is connected to the base electrode of PNP transistor 58 and since the collector electrode of PNP transistor 58 is connected to the base electrode of NPN transistor 56, the two complementary transistors cooperate to form a controlled solid-state switch having a main current flow path from the emitter electrode of transistor 58 through the two transistors to the emitter electrode of transistor 56. The junction of the base of transistor 58 and the collector of transistor 56 acts as a negative voltage responsive gate terminal for controlling the main flow of current from the emitter of transistor 58 to the emitter of transistor 56. Similarly, the junction of the base of transistor 56 and the collector of transistor 58 form another gate terminal which is responsive to positive signals for similarly controlling the main flow of current through the two transistor devices.

In the illustrated preferred embodiment, the two transistors 56 and 58 are adapted to be controlled by the negative-going pulses produced by the differentiating capacitor 50 and therefore, the junction point of the base of transistor 58 and the collector of transistor 56 is connected to the differentiating capacitor 50. The other gate terminal is connected to ground through a temperature stabilizing resistor 60 which provides desirable temperature stabilizing characteristics and improves switching recovery time.

The frequency divider network operates on a relaxation principle in that the charge and discharge of storage capacitor 62 is synchronously controlled such that an output pulse is produced at the emitter of transistor 56 upon the receipt of an integral number of negative differentiated pulses from capacitor 50. Its operation may be simply described by first considering the network when no pulses are produced by the differentiating capacitor 50. In such case, the potential at the junction of voltage divider resistors 52 and 54 will be a fixed fraction of the potential appearing on power bus 18, such as one-half. At this same time, the initial potential at the junction of capacitor 62 and variable resistor 64 will be zero; however, as the capacitor charges through resistors 64 and 66, its stored potential will increase until the emitter-base junction of transistor 58 becomes forward biased. At that point, the potential across capacitor 62 will be clamped to the potential provided by the voltage divider resistors 52 and 54 plus the small voltage drop across the emitter-base junction of the transistor. As a result of the clamping action of transistor 58, a relatively small current will flow through the transistor after capacitor 62 has become charged. Thus, in the absence of any incoming signal from differentiating capacitor 50, the current flow through transistor 58 will never reach a sufficient level to fully drive the transistor "on" and no output signal will be generated.

When the positive and negative pulses produced by the differentiating capacitor 50 are fed to the junction of voltage divider resistors 52 and 54, the potential at such junction is periodically increased and decreased. Thus, the base electrode voltage of transistor 58 will be periodically increased and decreased such that when capacitor 62 becomes charged to its clamped level, the subsequent generation of a negative pulse by differentiating capacitor 50 will increase the emitter-base voltage across transistor 58 by an amount sufficient to drive it fully on. In other words, time constant of capacitor 62, as determined primarily by the values of resistors 64 and 66, is such that the stored potential across capacitor 62 will not surpass the quiescent DC potential established by voltage divider resistors 52 and 54 until a preselected time interval has elapsed during which a desired number of negative pulses have been produced by capacitor 50, such as five. Thus, the emitter potential of transistor 58 will not exceed its base potential until after the fifth cycle of the incoming wave produced by capacitor 50 has been completed. The emitter-base junction of PNP transistor 58 will then be biased slightly on and the potential across capacitor 62 clamped at a level just greater than the quiescent voltage level produced by the voltage divider resistors 52 and 54. Thereafter, upon the receipt of the sixth negative pulse from the differentiating capacitor 50, the base electrode potential of transistor 58 is rapidly pulled down such that the emitter electrode potential with respect to the base increases and the transistor is turned fully on.

When transistor 58 becomes fully conductive, its collector electrode potential increases causing the base electrode potential of transistor 56 to similarly increase such that transistor 56 is turned on. In this manner, a discharge path is provided for storage capacitor 62 through transistors 58 and 56, line 68, and the parallel network formed by resistor 70 and the base-emitter paths of transistors 72 and 74. Thus, upon receipt of the sixth negative pulse from capacitor 50, capacitor 62 will rapidly discharge so as to develop a positive pulse across resistor 70. Thereafter, transistors 56 and 58 will revert to their nonconductive states permitting storage capacitor 62 to once again charge through resistors 64 and 66. As before, the potential stored across capacitor 62 will be insufficient to begin to turn on the emitter-base junction of transistor 58 until at least five cycles of the pulse train produced by differentiating capacitor 50 have been received whereupon the voltage across capacitor 62 will be clamped. Thereafter, upon receipt of the sixth negative-going pulse, transistor 58 will be turned on which will in turn render transistor 56 conductive so as to rapidly discharge the storage capacitor 62 and produce a positive pulse across resistor 70. The above described sequence will continue in similar fashion so that in effect, one pulse is produced on line 68 for every six negative-going pulses produced by the differentiating capacitor 50. Thus, the output pulses on line 68 from the frequency divider network of the circuit of the present invention have a frequency which is one-sixth that of the incoming frequency established by oscillator network 24.

The positive pulse train produced by the frequency divider is fed in common to the base electrodes of steering transistors 72 and 74. The collector electrodes of steering transistors 72 and 74 are respectively connected to the base electrodes of switching transistors 76 and 78 which have their collector electrodes cross-coupled by resistors 84 and 86 respectively so as to form a bistable network. In operation, when transistor 76 is conductive its collector electrode is tied to ground such that the potential fed through resistor 84 to the base electrode of transistor 78 is low. With the potential at the base of transistor 78 low, transistor 78 will be nonconductive such that its collector electrode is isolated from ground and exhibits a high potential. The high potential at the collector 78 is a cross-coupled back through resistor 86 to the base electrode of transistor 76 which is therefore maintained conductive.

Thus, when transistor 76 is on and transistor 78 is off, the potential at the base electrode of transistor 76 is high and that at the base electrode of transistor 78 is low. Thereafter, upon the application of a positive pulse through line 68 from the frequency divider, transistor 72 will become conductive so as to reduce the base electrode potential of switching transistor 76 thereby turning the transistor off. When transistor 76 is turned off, its collector potential increases whereupon the base electrode potential of transistor 78 correspondingly increases so as to turn on switching transistor 78.

Upon receipt of a subsequent pulse via line 68, transistor 74 will be rendered conductive to reduce the potential at the base electrode of transistor 78 causing it to revert to its off condition and resulting in the switching of transistor 76 to its on condition. In this manner, each successive pulse in the pulse train generated by the frequency divider causes the alternate conduction of the two switching transistors 76 and 78 under the control of steering transistors 72 and 74.

When transistor 76 of the bistable switching network is conductive, its collector electrode is effectively tied to ground such that field winding 88 of the synchronous motor 92 is connected directly across power supply 10 from power bus 14 through transistor 76 to ground. A current flow is thus established through field winding 88 from right to left as viewed in the drawing. Upon receipt of a subsequent pulse from line 68, transistor 76 will be turned off and transistor 78 will become conductive so as to remove energizing potential from winding 88 and connect field winding 90 directly across power supply 10. When field winding 90 is connected across power supply 10, however, a current flow will be established through the winding from left to right as visualized in the drawing such that the synchronous motor 92 is effectively impressed with an alternating current signal as the bistable network is alternately switched so as to drive a timing mechanism (not shown) at a speed directly related to the frequency of the alternate current signal. Since the alternate switching of transistors 76 and 78 is dependent upon the frequency of the pulse train produced by the frequency dividing circuit, and since the output frequency of the frequency divider is directly dependent upon the frequency established by oscillator 24, the alternating current signal impressed across the field windings of synchronous motor 92 is regulated by the oscillator circuit 24 such that the timing mechanism is accurately driven so as to properly carry out its timing function. The timing mechanism may be a clock, elapsed time indicator, the chart drive for a recorder and the like.

It is noted that the inverter circuit of the present invention is particularly well suited for use under conditions of varying ambient temperature due to the extremely stable operation of oscillator 24 provided by the piezoelectric tuning fork filter 39. In addition, resistor 60 in the frequency dividing network provides additional temperature compensation for the circuit of the present invention as does resistor 70 connected between the base electrodes of transistors 72 and 74 and ground. Such stable operation, for example, may be provided over an approximate temperature range between minus 40° and 150° F. Furthermore, due to the solid state construction of the illustrated preferred embodiment as well as the fact that no inductor devices are needed, the present invention is readily adaptable to microminiaturization fabrication techniques at a savings of both size and weight. Both its amenability to microminiaturization and its effective temperature stable operation enable the development of a number of accurate timing devices which were heretofore impractical.

Thus, while the circuit of the present invention is simple in construction and economical in manufacture, it provides a temperature stable alternating current output signal for the operation of a synchronous motor for driving a clock mechanism and the like. In addition, due to the simplicity of the design of the circuit of the present invention, it is extremely reliable and is therefore useful in applications requiring accurate timing over extended periods of constant use.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. An inverter circuit for a synchronous motor comprising in combination
   input means adapted to be connected with a source of direct current operating potential;
   oscillator means connected with said input means and including an amplifier having an input and an output, a piezoelectric tuning fork filter connected with said input and output of said amplifier to form a closed feedback loop whereby said oscillator generates a sinusoidal alternating current signal at a particular frequency, and a variable resistor serially connected in said closed feedback loop whereby the particular frequency of said sinusoidal alternating current signal may be varied;
   frequency-dividing means connected with said oscillator means and including a storage capacitor adapted to be selectively charged and discharged for producing periodic output pulses synchronized with said sinusoidal alternating current signal and having a frequency equal to said particular frequency divided by an integer;
   a pair of field windings included in the synchronous motor;
   power-switching means connected with said input means, said frequency dividing means, and said pair of field windings for alternately establishing a current flow through each of said pair of field windings in response to said periodic output pulses from said frequency dividing means whereby a stable frequency alternating current signal is applied to the synchronous motor; and
   said amplifier of said oscillator means including a transistor having emitter, base and collector electrodes, and said variable resistor is connected between the collector electrode of said transistor and said piezoelectric tuning fork filter.

2. The invention as recited in claim 1 wherein said piezoelectric tuning fork filter includes a tuning fork electrically connected to a point of reference potential and having a pair of tines, a piezoelectric input transducer mounted upon one of said pair of tines and electrically connected with said variable resistor, and a piezoelectric output transducer mounted upon the other of said pair of tines and electrically connected with the base electrode of said transistor.

3. An inverter circuit for a synchronous motor comprising in combination
   input means adapted to be connected with a source of direct current operating potential;
   oscillator means connected with said input input means and including an amplifier having an input and an output, and a piezoelectric tuning fork filter connected with said input and output of said amplifier to form a closed feedback loop whereby said oscillator generates a sinusoidal alternating current signal at a particular frequency;
   frequency-dividing means connected with said oscillator means and including a storage capacitor adapted to be selectively charged and discharged for producing periodic output pulses synchronized with said sinusoidal alternating current signal and having a frequency divided by an integer;
   a pair of field windings included in the synchronous motor; and
   power-switching means connected with said input means, said frequency dividing means, and said pair of field windings for alternately establishing a current flow through each of said pair of field windings in response to said periodic output pulses from said frequency dividing means whereby a stable frequency alternating current signal is applied to the synchronous motor;
   said frequency-dividing means including resistor means connected with said input means and said storage capacitor to provide a charging path therefor, and controlled switch means connected with said storage capacitor, said oscillator means and said power-switching means for selectively providing a discharge path for said storage capacitor in synchronism with said sinusoidal alternating current signal.

4. The invention as recited in claim 3 wherein said frequency-dividing means includes voltage divider means connected with said input means, said controlled switch means and said oscillator means.

5. The invention as recited in claim 4 wherein said voltage-dividing means includes a pair of resistors serially connected between said input means and a point of reference potential.

6. The invention as recited in claim 5 wherein said resistor means and said storage capacitor are serially connected between said input means and said point of reference potential.

7. The invention as recited in claim 6 wherein said controlled switch means has a first terminal connected to the junction of said resistor means and said storage capacitor, a second terminal connected to said power-switching means, and a gate terminal connected to the junction of said pair of voltage-dividing resistors.

8. The invention as recited in claim 7 wherein said controlled switch means includes another gate terminal, and wherein said frequency-dividing means includes a resistor connected between said other gate terminal and said point of reference potential.

9. The invention as recited in claim 7 wherein said controlled switch means includes an NPN transistor and a PNP transistor, each having emitter, base and collector electrodes.

10. The invention as recited in claim 9 wherein the base electrode of said NPN transistor is connected with the collector electrode of said PNP transistor, and the base electrode of said PNP transistor is connected with the collector electrode of said NPN transistor.

11. The invention as recited in claim 10 wherein the emitter electrode of one of said NPN and PNP transistors is connected with said first terminal and the emitter electrode of the other of said NPN and PNP transistors is connected with said second terminal.

12. The invention as recited in claim 11 wherein the junction of the base electrode of one of said NPN and PNP transistors and the collector electrode of the other of said NPN and PNP transistors is connected with said gate terminal.

13. An inverter circuit for a synchronous motor comprising
   input means adapted to be connected with a source of direct current operating potential;
   oscillator means connected with said input means and including an amplifier having an input and an output, and a piezoelectric tuning fork filter connected with said input and output of said amplifier to form a closed feedback loop whereby said oscillator generates a sinusoidal alternating current signal at a particular frequency;
   frequency-dividing means connected with said oscillator means and including a storage capacitor adapted to be selectively charged and discharged for producing periodic output pulses synchronized with said sinusoidal alternating current signal and having a frequency equal to said particular frequency divided by an integer;
   a pair of field windings included in the synchronous motor;
   power-switching means connected with said input means, said frequency-dividing means, and said pair of field windings for alternately establishing a current flow through each of said pair of field windings in response to said periodic output pulses from said frequency-dividing means whereby a stable frequency-alternating current signal is applied to the synchronous motor;
   said power-switching means having a first switching transistor with a collector electrode connected to one side of one of said pair of field windings and an emitter electrode connected to a point of reference potential, and a second switching transistor with a collector electrode connected to one side of the other of said pair of field windings and an emitter electrode connected to said point of reference potential;

said pair of field windings having its other sides connected to said input means; and said power-switching means including first and second steering transistors each having an emitter electrode connected to said point of reference potential, a base electrode connected in common to said frequency dividing means and a collector electrode connected to the base electrode of a respective one of said first and second switching transistors.

14. The invention as recited in claim 13 wherein the collector electrodes of said first and second switching transistors are each cross-coupled by a respective one of a pair of resistors to the base electrodes of said second and first switching transistors, respectively.

15. An inverter circuit for a synchronous motor comprising in combination input means adapted to be connected with a source of direct current operating potential;

oscillator means connected with said input means and including an amplifier having an input and an output, and a piezoelectric tuning fork filter connected with said input and output of said amplifier to form a closed feedback loop whereby said oscillator generates a sinusoidal alternating current signal at a particular frequency;

wave-shaping means connected with said oscillator means for converting said sinusoidal alternating current signal to a square-wave alternating current signal at said particular frequency;

differentiating means connected with said wave-shaping means for differentiating said square wave alternating current signal;

frequency-dividing means connected with said differentiating means and including a storage capacitor adapted to be selectively charged and discharged for producing periodic output pulses synchronized with said differentiated square-wave alternating current signal and having a frequency equal to said particular frequency divided by an integer;

a pair of field windings included in the synchronous motor; and power-switching means connected with said input means, said frequency dividing means, and said pair of field windings for alternately establishing a current flow through each of said pair of field windings in response to said periodic output pulses from said frequency-dividing means whereby a stable frequency alternating current signal is applied to the synchronous motor.

16. The invention as recited in claim 15 wherein said oscillator means includes a variable resistor serially connected in said closed feedback loop whereby said particular frequency of said sinusoidal alternating current signal may be varied.

17. The invention as recited in claim 15 wherein said frequency dividing means includes resistor means connected with said input means and said storage capacitor to provide a charging path therefor, and controlled switch means connected with said storage capacitor, said differentiating means and said power switching means for selectively providing a discharge path for said storage capacitor in synchronism with said differentiated square-wave alternating current signal.

18. The invention as recited in claim 17 wherein said frequency-dividing means includes voltage divider means connected with said input means, said controlled switch means and said differentiating means.

19. The invention as recited in claim 18 wherein said voltage-dividing means includes a pair of resistors serially connected between said input means and a point of reference potential.

20. The invention as recited in claim 19 wherein said resistor means and said storage capacitor are serially connected between said input means and said point of reference potential.

21. The invention as recited in claim 20 wherein said controlled switch means has a first terminal connected to the junction of said resistor means and said storage capacitor, a second terminal connected to said power switching means, and a gate terminal connected to the junction of said pair of voltage-dividing resistors.

22. The invention as recited in claim 21 wherein said controlled switch means includes an NPN transistor and a PNP transistor, each having emitter, base and collector electrodes.

23. The invention as recited in claim 15 wherein said power switching means includes a first switching transistor having a collector electrode connected to one side of one of said pair of field windings and an emitter electrode connected to a point of reference potential, and a second switching transistor having a collector electrode connected to one side of the other of said pair of field windings and an emitter electrode connected to said pair of field windings are connected to said input means.

* * * * *